United States Patent
Dollinger et al.

(10) Patent No.: US 9,849,835 B2
(45) Date of Patent: Dec. 26, 2017

(54) OPERATING A HEAD-UP DISPLAY OF A VEHICLE AND IMAGE DETERMINING SYSTEM FOR THE HEAD-UP DISPLAY

(71) Applicant: Bayerische Motoren Werke Aktiengesellschaft, Munich (DE)

(72) Inventors: Klaus Dollinger, Munich (DE); Axel Schwab, Munich (DE); Alexander Buchner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/627,117

(22) Filed: Feb. 20, 2015

(65) Prior Publication Data
US 2015/0158430 A1 Jun. 11, 2015

Related U.S. Application Data (63) Continuation of application No. PCT/EP2013/066149, filed on Aug. 1, 2013.

(30) Foreign Application Priority Data

Aug. 22, 2012 (DE) .......................... 10 2012 214 903

(51) Int. Cl.
*G06T 15/00* (2011.01)
*B60R 1/00* (2006.01)
(Continued)

(52) U.S. Cl.
CPC ................ *B60R 1/00* (2013.01); *G02B 27/01* (2013.01); *G02B 27/0101* (2013.01);
(Continued)

(58) Field of Classification Search
None
See application file for complete search history.

(56) References Cited

U.S. PATENT DOCUMENTS

| 5,051,735 A | 9/1991 | Furukawa |
| 5,533,177 A | 7/1996 | Wirtz et al. |

(Continued)

FOREIGN PATENT DOCUMENTS

| DE | 38 88 439 T2 | 7/1994 |
| DE | 10 2004 012 859 A1 | 10/2004 |

(Continued)

OTHER PUBLICATIONS

International Search Report (PCT/ISA/210) dated Feb. 28, 2014, with English translation (Eight (8) pages).

(Continued)

*Primary Examiner* — Said Broome
(74) *Attorney, Agent, or Firm* — Crowell & Moring LLP (57) ABSTRACT

On the basis of a predetermined three-dimensional vehicle environment model and of a second image, acquired at that time, of an image sequence, a corrected display image is determined. The vehicle environment model is determined based on at least a first image of the image sequence and includes an object detected in the first image that has a predetermined resultant absolute position and/or a predetermined resultant position with reference to the vehicle. The second image is acquired a predetermined period of time after the first image and includes the detected object. The corrected display image includes at least one graphic element which represents the detected object and is determined such that it is suitable for being projected onto a display area of the head-up display so as to be perceived by a viewer of the display area from a predetermined viewing position with direct reference to the actual environment of the vehicle.

10 Claims, 4 Drawing Sheets

(51) Int. Cl.
  *G02B 27/01* (2006.01)
  *G06T 11/00* (2006.01)
(52) U.S. Cl.
  CPC .......... *G02B 27/0179* (2013.01); *G06T 11/00* (2013.01); *G06T 15/00* (2013.01); *B60R 2300/205* (2013.01); *G02B 2027/014* (2013.01); *G02B 2027/0134* (2013.01); *G02B 2027/0181* (2013.01)

(56) References Cited

U.S. PATENT DOCUMENTS

| | | | |
|---|---|---|---|
| 6,243,207 B1 * | 6/2001 | Kawamura | G02B 27/01 248/917 |
| 2004/0193331 A1 | 9/2004 | Kashiwada et al. | |
| 2005/0162392 A1 * | 7/2005 | Spruck | G06F 3/04815 345/163 |
| 2006/0139503 A1 | 6/2006 | Larson et al. | |
| 2009/0284552 A1 * | 11/2009 | Larson | G02B 27/01 345/632 |
| 2010/0036548 A1 * | 2/2010 | Nichols | G01C 23/00 701/4 |
| 2010/0253593 A1 | 10/2010 | Seder et al. | |
| 2010/0253596 A1 | 10/2010 | Szczerba et al. | |
| 2010/0287500 A1 * | 11/2010 | Whitlow | G02B 27/01 715/810 |
| 2011/0043644 A1 | 2/2011 | Munger et al. | |

FOREIGN PATENT DOCUMENTS

| | | |
|---|---|---|
| DE | 10 2010 013 395 A1 | 1/2011 |
| DE | 10 2010 013 224 A1 | 3/2011 |
| DE | 10 2010 003 850 A1 | 10/2011 |
| EP | 0 560 779 B1 | 6/1996 |

OTHER PUBLICATIONS

German Search Report dated Jun. 6, 2013, with English translation (Nine (9) pages).

* cited by examiner

OPERATING A HEAD-UP DISPLAY OF A VEHICLE AND IMAGE DETERMINING SYSTEM FOR THE HEAD-UP DISPLAY

CROSS REFERENCE TO RELATED APPLICATIONS

This application is a continuation of PCT International Application No. PCT/EP2013/066149, filed Aug. 1, 2013, which claims priority under 35 U.S.C. §119 from German Patent Application No. 10 2012 214 903.1, filed Aug. 22, 2012, the entire disclosures of which are herein expressly incorporated by reference.

BACKGROUND AND SUMMARY OF THE INVENTION

The invention relates to a method and device for operating a head-up display of a vehicle and to an image determining system for the head-up display.

In a motor vehicle, technical information, for example the current vehicle speed, the engine rotational speed or the oil temperature, as well as traffic and navigation data, are provided to the driver during a trip. The information is usually displayed on an instrument panel. When reading the displayed information from the instrument panel a driver is distracted at least for a short time from the traffic situation. Head-up displays make it possible to display information directly in the field of view of the driver on the windshield of the vehicle. In this way, information content can be comprehended while simultaneously the road conditions remain in the driver's field of view.

Modern head-up displays generate a virtual image which, for the driver, appears to lie at a certain distance before the windshield, for example at the end of the hood.

Modern vehicles increasingly have driver assistance systems. By means of these driver assistance systems it is possible, for example, to recognize and locate objects, such as pedestrians, other vehicles and traffic signs. The head-up display can be used for optically signaling information with respect to the recognized objects.

The object of the invention is to provide a method and a device for operating a head-up display, as well as an image determining system, which makes a contribution in that information can be signaled optically with a high quality by way of the head-up display.

This and other objects are achieved according to the invention by a method for operating a head-up display for a vehicle, wherein on the basis of a predetermined three-dimensional vehicle environment model which is determined on the basis of at least one first image of an image sequence and which comprises an object which is detected in the first image and has a predetermined resulting absolute position and/or a predetermined resulting position with regard to the vehicle, a corrected display image is determined. The corrected display image is determined on the basis of a currently captured second image of the image sequence, which is captured, for a predetermined period of time after the first image and which comprises the detected object. The corrected display image comprises at least one graphical element, which represents the detected object and is determined in such a way that it is suitable to be projected onto a predetermined display field of the head-up display, so that the at least one graphic element is perceived by a viewer of the display field from a predetermined viewing position with direct reference to the real environment of the vehicle.

According to a first aspect the invention is characterized by a method and a corresponding device for operating a head-up display. In this connection on the basis of a predetermined three-dimensional vehicle environment model and on the basis of a currently captured second image of the image sequence, a corrected display image is determined. In this case the vehicle environment model is determined on the basis of at least one first image of an image sequence and comprises an object which is detected in the first image and has a predetermined resulting absolute position and/or a predetermined resulting position with regard to the vehicle. The second image is captured a predetermined period of time after the first image and comprises the detected object. The corrected display image comprises at least one graphic element, which represents the detected object and is determined in such a way that it is suitable to be projected onto a predetermined display field of the head-up display, so that the at least one graphic element is perceived by a viewer of the display field from a predetermined viewing position with direct reference to the real environment of the vehicle.

This advantageously makes it possible to correct latency and/or delay times which may occur during determination of the original display image.

This can advantageously make a contribution in that information can be signaled optically with a high quality by way of the head-up display. The graphic element can be displayed in a contact-analog manner. In head-up displays a distinction is made between contact-analog and non-contact-analog display. Contact-analog forms of display enhance the environment perceived by the driver by superimposition of artificially generated scenery. The information is displayed with a direct reference to the environment.

Processing times and/or latency times which occur on the basis of a transmission of image data in the vehicle and/or the determination of the original and/or of the corrected display image, in particular on the basis of complex algorithms for object recognition and/or for object location and/or motion prediction of the determined objects, can be compensated for. Thus it is advantageously possible for the representation of the at least one graphic element on the head-up display to be precisely positioned, or at least very precisely positioned, and without time lag, or at least with only very little time lag. A further advantage is that simpler algorithms can be used for the motion prediction and thus more efficient processing is possible.

A signaling signal for control of the head-up display for optical signaling of the corrected display image can be determined on the basis of the corrected display image. The signaling signal can represent respective pixel values of the corrected display image.

In an advantageous embodiment of the first aspect, the corrected display image is determined on the basis of an original display image having the at least one graphic element which represents the detected object of the detected first image. The original display image is determined on the basis of the predetermined three-dimensional vehicle environment model in such a way that it is suitable to be projected onto the predetermined display field of the head-up display, so that the at least one graphic element is perceived by the viewer of the display field from the predetermined viewing position with direct reference to the real environment of the vehicle. This can advantageously make a contribution to determining the corrected display image simply and quickly, since in this case an image synthesis, also referred to as rendering, has already taken place and pixel values of two-dimensional images can be compared and/or evaluated.

In a further advantageous embodiment of the first aspect, a detail of the second image which comprises the at least one object is determined on the basis of a determined intrinsic movement of the vehicle, and the corrected display image is determined on the basis of the detail of the second image. This has the advantage that it may be sufficient to transfer a smaller amount of image data to be transmitted and/or to be processed for determining the corrected display image. The detail of the second image may correspond to a detail which the corrected display image represents.

In a further advantageous embodiment of the first aspect, the second image comprises a stereo image and the detail of the second image is determined on the basis of a position of the vehicle driver and a capture position of the second image. This has the advantage that a viewing angle-corrected detail of the second image can be used for determination of the corrected display image. This advantageously enables a high-quality perspective representation of the at least one graphic element on the head-up display, so that from the viewpoint of the driver of the vehicle the representation of the at least one graphic element takes place without distortion.

In a further advantageous embodiment, a current first position of the at least one object is determined on the basis of the second image and/or of the detail of the second image. The corrected display image is determined on the basis of the first position and a second position which has the at least one object in the vehicle environment model. This enables an efficient determination of a position offset of the at least one object and thus an efficient determination of the corrected display image.

In a further advantageous embodiment of the first aspect, a characteristic image feature of the at least one object is determined on the basis of the second image and/or of the detail of the second image and the corrected display image is determined on the basis of the image feature. This has the advantage that the second image and/or the detail of the second image can be analyzed very simply and quickly. Thus the determination of the corrected display image can take place very efficiently and quickly. In this case the respective image feature may comprise a 1-bit graphic.

In a further advantageous embodiment of the first aspect, the characteristic image feature comprises a respective border of the at least one object. This enables an efficient calculation of the image feature.

In a further advantageous embodiment of the first aspect, a color and/or brightness of the graphic element in the corrected display image is adapted on the basis of a characteristic image texture of the at least one object in the first image and/or the second image and/or the detail of the second image. This has the advantage that the color and/or the brightness of the graphic element can be adapted on the basis of a color and/or brightness of the at least one object.

According to a second aspect, the invention is characterized by an image determining system for a head-up display. The image determining system comprises an evaluation unit which is designed to detect at least one predetermined object and to determine a position of the at least one object on the basis of predetermined image data of a captured first image of an image sequence. Furthermore, the image determining system comprises a prediction unit which is designed to determine an absolute movement and/or a relative movement of the at least one object with reference to the vehicle on the basis of at least one predetermined sensor signal. The image determining system comprises a scene unit which is designed to determine a three-dimensional vehicle environment model on the basis of the at least one first image of the image sequence and the determined absolute and/or relative movement of the at least one object. Furthermore, the image determining system comprises a device for operating the head-up display according to the first aspect.

Other objects, advantages and novel features of the present invention will become apparent from the following detailed description of one or more preferred embodiments when considered in conjunction with the accompanying drawings.

DETAILED DESCRIPTION OF THE DRAWINGS

Elements having the same design or function are provided with the same reference numerals in all the drawings.

Figure 1:
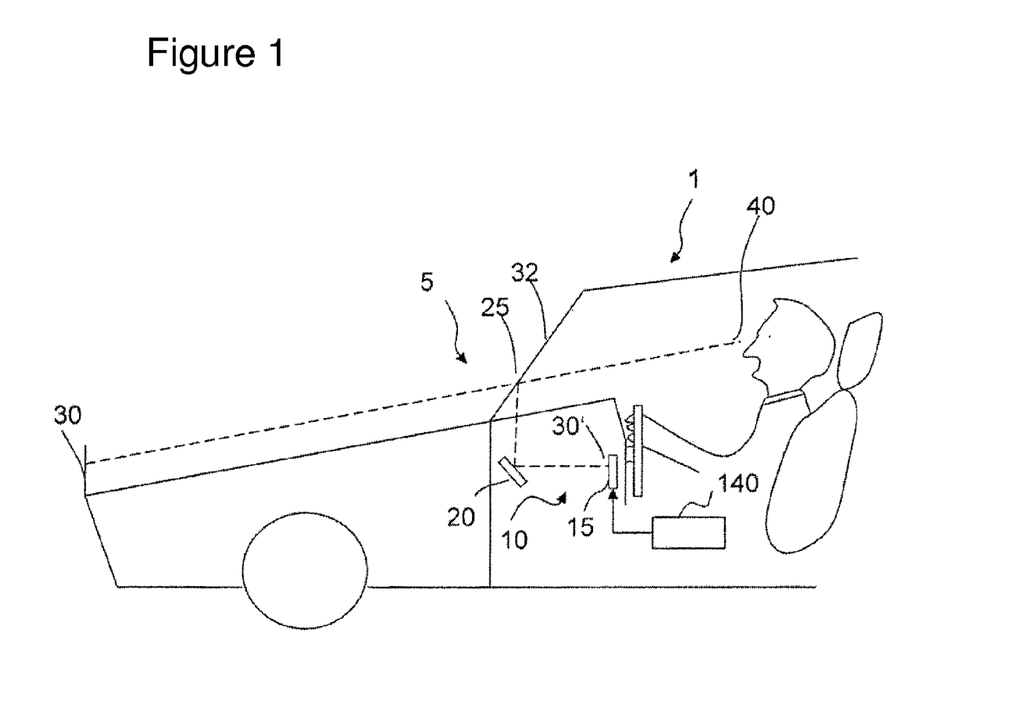
FIG. 1 is a schematic representation of a head-up display of a vehicle.

FIG. 1 shows an embodiment of a head-up display 5 for a vehicle 1, in particular an automobile. The head-up display 5 includes an image generating system 10 for generating a virtual image 30. The image generating system 10 includes a display 15 for generating a real image 30' and an optical system for generating the virtual image 30. The optical system includes an imaging first mirror 20 and second mirror 25. A real image 30' generated by the display 15 is initially directed onto the first mirror 20 and projected by the first mirror 20 onto the second mirror 25. The second mirror 25 may be constructed as a windshield 32 of a vehicle 1.

From a predetermined eyebox 40 of a driver, the virtual image 30 appears at a distance behind the windshield 32, for example at the end of the hood. The virtual image 30 can generally only be seen from a defined region, i.e., the so-called eyebox region 40. The eyebox 40 is usually designed so that the complete virtual image 30 can be seen from the entire required eyebox region.

Static display content which is permanently or frequently displayed can be represented in the virtual image 30. Furthermore, the image generating system 10 may be designed so that image contents which are only displayed as the situation requires, and temporarily, are displayed in the virtual image 30. The head-up display 5 can be designed, in particular, as a contact-analog head-up display 5. In head-up displays a distinction is made between contact-analog and non-contact-analog display. Contact-analog forms of display enhance the environment perceived by the driver by superimposition of artificially generated scenery. On the other hand, non-contact-analog forms of display present information without direct referenced to the environment.

Figure 2:
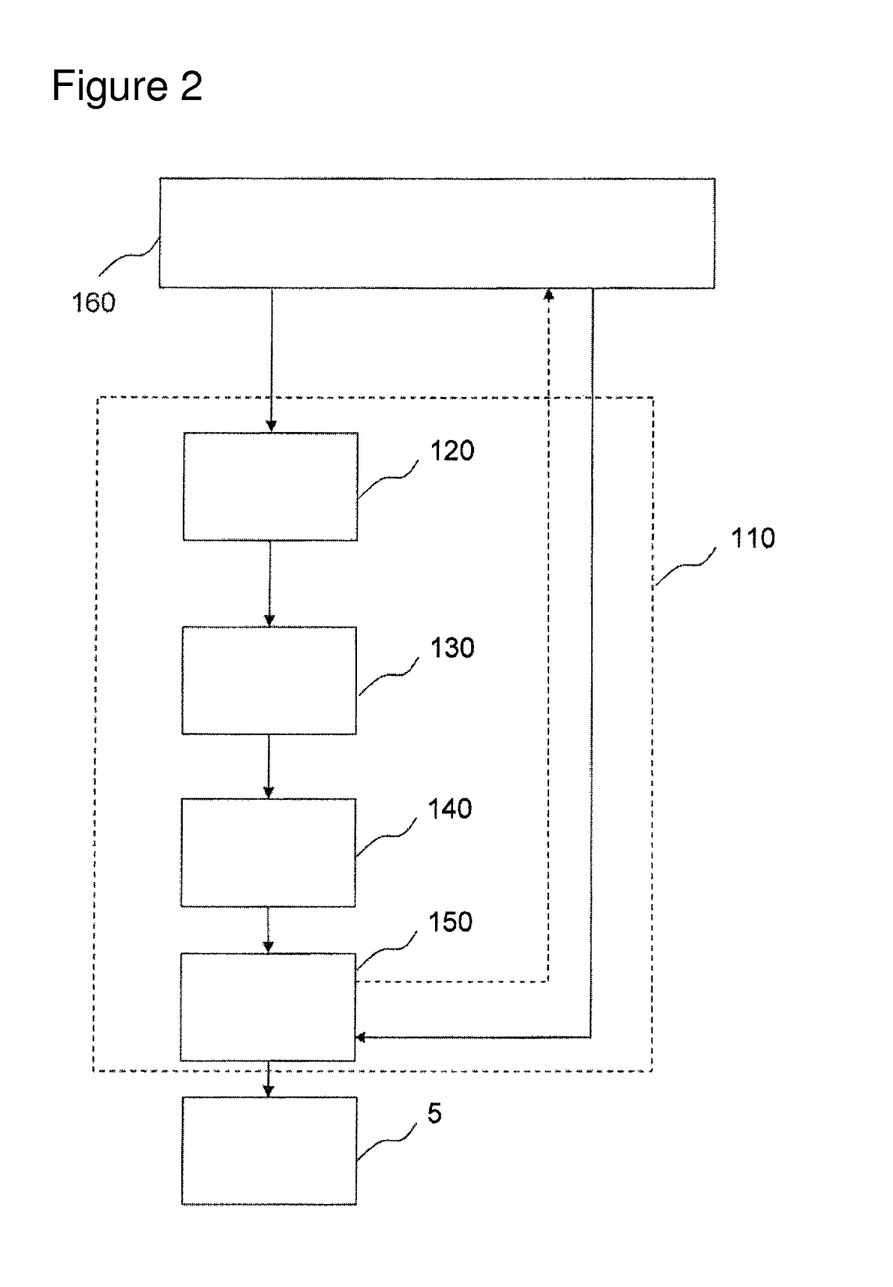
FIG. 2 is a block diagram of an embodiment of an image determining system for a head-up display.

FIG. 2 shows an image determining system 110 for the head-up display 5 of the vehicle 1.

The image determining system 110 has an evaluation unit 120, a prediction unit 130, a scene unit 140 and a controller 150 for operating the head-up display 5. The evaluation unit 120, the prediction unit 130, the scene unit 140 and the controller 150 can each have a processor unit or can jointly use one processor unit. The evaluation unit 120 and the prediction unit 130 can be used additionally for one or more driver assistance systems.

One or more optical sensors 160 is/are associated with the image determining system 110. Alternatively, the image determining system 110 may comprise the optical sensor 160 or a plurality of optical sensor 160. The at least one optical sensor 160 is designed to detect an image sequence from images of a predetermined environment of the vehicle 1. The at least one optical sensor 160 may comprise a camera, in particular a video camera.

The optical sensor 160 is coupled in signaling terms to the image determining system 110 for transmission of image data of the captured images.

The image data from captured images are relayed from the optical sensor 160 to the evaluation unit 120.

The at least one evaluation unit 120 is designed to detect at least one predetermined object and to determine a position of the at least one object on the basis of the image data of a captured first image of an image sequence. The at least one evaluating unit 120 is designed, for example, to recognize objects moving on a roadway. Alternatively or in addition, the evaluating unit 120 is designed to recognize predetermined traffic signs and/or a traffic lane.

The position of the at least one object includes an absolute position and/or a relative position of the object in relation to the vehicle 1. Algorithms known to the person skilled in the art for this purpose can be used for the object recognition and object location on the basis of the image data.

The at least one evaluation unit 120 is coupled in signaling terms to the prediction unit 130 for relaying the determined object data to the prediction unit 130.

Furthermore, the prediction unit 130 is designed to determine an absolute movement and/or a relative movement of the at least one object with reference to the vehicle 1 on the basis of at least one predetermined sensor signal.

Thus, the prediction unit 130 is designed for the prediction of movements of the recognized objects. Data from a locating device as well as from an additional sensor system are, for example, delivered to the prediction unit 130. The locating device may, for example, include an angle-resolving radar sensor by which the distance x (approximately in the direction of the current longitudinal axis of the relevant vehicle 1), the relative speed of the object as well as the azimuth angle of the object are measured for each located object. The prediction unit 130 is designed, for example, to determine a transverse offset of the object on the basis of the distance and the azimuth angle. The sensor system includes, for example, a speed sensor for measuring the intrinsic speed of the vehicle 1 as well as a yaw rate sensor, by which the yaw rate of this vehicle 1 is measured. The prediction unit 130 has different dynamic models which serve to model the dynamic behavior of a respectively located object and to predict its future behavior.

The prediction unit 130 is coupled in signaling terms to the scene unit 140. The scene unit 140 is designed to determine a three-dimensional vehicle environment model on the basis of the at least one first image of the image sequence and the determined absolute and/or relative movement of the at least one object. The vehicle environment model can additionally be determined on the basis of predetermined route data and/or further detected sensor signals, for example on the basis of a distance radar signal or an ultrasonic signal from an ultrasonic sensor of a parking assistance system. The route data can be stored, for example, in a map database of a navigation system. Furthermore, for the determination of the vehicle environment model, further environmental data provided via a wireless interface can be used by equipment outside the vehicle.

The scene unit 140 is coupled in signaling terms to the controller 150 for operating the head-up display 5. Furthermore, the controller 150 is coupled in signaling terms to the optical sensor 160. The controller 150 for operating the head-up display 5 is designed to determine a corrected display image on the basis of the vehicle environment model and on the basis of a currently captured second image of the image sequence. In this case, the vehicle model environment model represents the at least one object which is detected in the first image and which has a predetermined resulting absolute position and/or a predetermined resulting position with regard to the vehicle 1. The second image likewise includes the detected object, the second image being captured a predetermined period of time after the first image. The predetermined period of time can, for example, have two to four detection periods B_1, B_2, B_3, B_4 of the optical sensor 160. The corrected display image includes at least one graphic element which represents the detected object. In this case, the corrected display image is determined in such a way that it is suitable to be projected onto a predetermined display field of the head-up display, so that the at least one graphic element is perceived by a viewer of the display field from a predetermined viewing position with direct reference to the real environment of the vehicle 1.

The controller 150 is designed, for example, to determine a detail of the second image which includes the at least one object on the basis of a determined intrinsic movement of the vehicle 1, and to determine the corrected display image on the basis of the detail of the second image. In this connection it may be provided that the intrinsic movement of the vehicle 1 is estimated by means of the prediction unit. The controller 150 is designed, for example, to determine the detail of the second image on the basis of this determined intrinsic movement of the vehicle 1, and to request the image data for the detail of the second image from the optical sensor. This has the advantage that the transmission of the requested image data from the optical sensor 160 to the controller 150 can take place more quickly and/or with a lower transmission bandwidth by comparison with a transmission of all the image data of the second image.

Furthermore, the second image can include a stereo image and the detail of the second image can be determined on the basis of a position of the vehicle driver and a capture position of the second image.

In this case the capture position preferably represents the position of the at least one optical sensor 160 in the vehicle 1. This makes it possible to determine a viewing angle-corrected detail of the second image.

The controller 150 is, for example, designed to determine a current first position of the at least one object on the basis of the second image and/or of the detail of the second image. The corrected display image can be determined on the basis of the first position and a second position which has the at least one object in the vehicle environment model. If the first and the second position are different, a position of the graphic element can be adjusted in the corrected display image on the basis of the first and/or second position.

Furthermore, the controller 150 is, for example, designed to determine a characteristic image feature of the at least one object on the basis of the second image and/or of the detail of the second image and to determine the corrected display image on the basis of the characteristic image feature. The first aspect of the characteristic image feature may include a respective border of the at least one object. This makes it possible that the first and second position and/or a position offset of the at least one object can be determined, for example, by means of a simple pattern matching.

Furthermore, it may be provided that a color and/or brightness of the graphic element in the corrected display image is adapted on the basis of a characteristic image texture of the at least one object in the first image and/or the second image and/or the detail of the second image. This makes it possible, on the basis of a color of the at least one object, to adapt the graphic element in such a way that perception of the graphic element by the driver of the vehicle and/or further vehicle users can take place simply, in particular when the driver of the vehicle perceives the graphic element, which for example includes a border, and a real object superimposed on the roadway.

The controller 150 includes, for example, an image synthesis unit 250, also referred to as a rendering unit, which is designed to determine respective pixel values of the corrected display image on the basis of the three-dimensional vehicle model. The image synthesis unit 250 is designed, for example, to determine objects which are visible by a virtual viewer, to determine an appearance of surfaces influenced by the material properties thereof, and to calculate a light distribution within a scene.

The controller 150 is coupled in signaling terms to the head-up display unit of the vehicle 1. The controller 150 is designed to determine, on the basis of the corrected display image, a signaling signal for control of the head-up display 5 for optical signaling of the corrected display image. In this case the signaling signal represents respective pixel values of the corrected display image.

In the embodiment of the image determining system 110 shown in FIG. 2 the corrected display image is determined on the basis of the three-dimensional vehicle environment model and of the second image. An image synthesis, also referred to as rendering, takes place only after the position of the at least one object is corrected.

Figure 3:
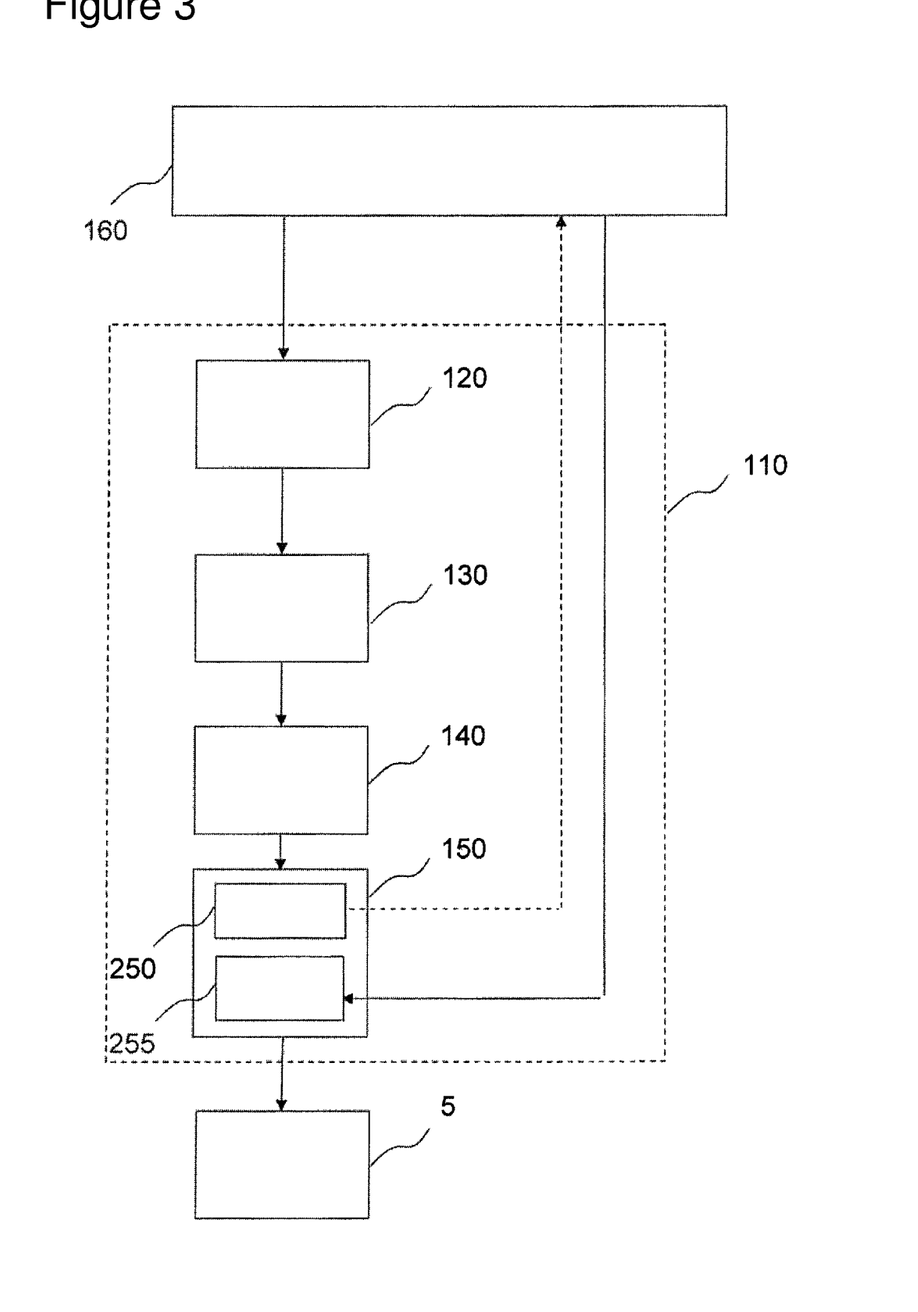
FIG. 3 is a block diagram of another embodiment of the image determining system for the head-up display.

In the embodiment shown in FIG. 3, the controller 150 has the image synthesis unit 250 and a comparison and correction unit 255. In contrast to the embodiment shown in FIG. 2, in this case the image synthesis unit 250 is designed to determine an original display image. In this case the corrected display image is determined on the basis of the second image and an original display image which at least has the graphic element which represents the detected object of the captured first image. In this case the original display image having the at least one graphic element is determined on the basis of the predetermined three-dimensional vehicle environment model in such a way that it is suitable to be projected onto the predetermined display field of the head-up display 5, so that the at least one graphic element is perceived by the viewer of the display field from the predetermined viewing position with direct reference to the real environment of the vehicle 1.

Figure 4:
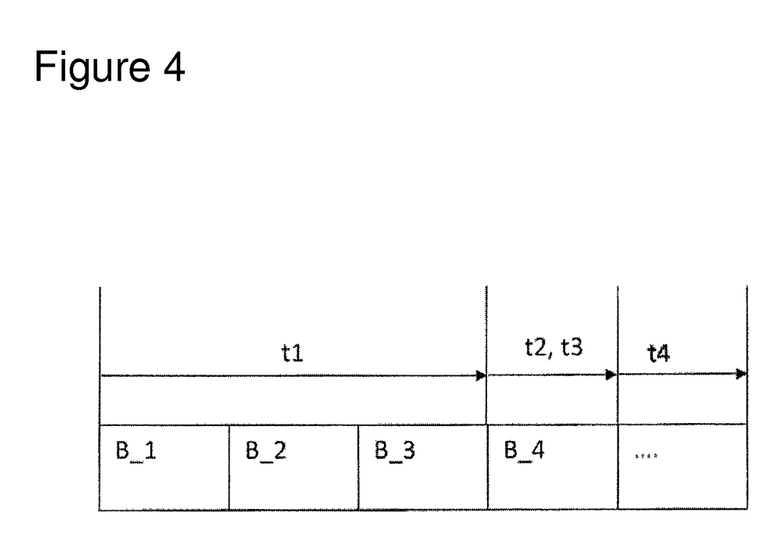
FIG. 4 is a timing diagram for determining and signaling a corrected display image.

FIG. 4 shows an example of a timing diagram for determining the corrected display image. FIG. 4 shows a plurality of consecutive image capture periods B_1, B_2, B_3, B_4. A first period of time t1 represents a processing time for the object recognition and object location. A second length of time t2 represents a processing time for the motion prediction and the determination of the three-dimensional vehicle environment model. A third period of time t3 represents a processing time which is necessary for determination of the detail of the second image. A fourth period of time t4 represents a processing time which is necessary for the determination of the corrected display image, in particular for the image synthesis, as well as a transmission time for transmission and signaling the pixel data of the corrected display image to the display of the head-up display 5. As can be seen in FIG. 4, the processing time and/or latency period from the capture of the first image to the display of the at least one graphic element on the head-up display 5 includes more detection periods B_1, B_2, B_3, B_4 of the optical sensor 160.

The optical sensor 160 has, for example, a period duration for the capture of consecutive images of 60 ms. Thus, in the example shown in FIG. 4, it is possible to compensate for a processing time of approximately 180 ms.

LIST OF REFERENCE NUMERALS

1 vehicle
5 head-up display
10 image generating system
15 display
20 first mirror
25 second mirror
30 virtual image
30' real image
32 windshield
40 eyebox
110 image determining system
120 evaluation unit
130 prediction unit
140 scene unit
150 controller (electronic control unit)
160 optical sensor
250 image synthesis unit
255 comparison and correction unit
B_1, B_2, capture period
B_3, B_4
t1 first period of time
t2 second period of time
t3 third period of time
t4 fourth period of time The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a head-up display for a vehicle, the method comprising the acts of:
   determining a vehicle environment model based on a first image of a sequence of images of the vehicle environment captured via a sensor unit of the vehicle, wherein the vehicle environment includes a real object detected in the first image for which an absolute position and/or a relative position with respect to the vehicle has been determined;
   determining an original graphic based on the environment model, the original graphic corresponding to the real object and projected onto a display field of the head-up display such that the graphic is perceived by the viewer of the display field from a predetermined viewing position with direct reference to the real object, wherein the real object is also perceivable by the viewer through the display field from the predetermined viewing position;
   determining a corrected graphic corresponding to the real object and based on the original graphic, the vehicle environment model, and a second image of the image sequence, the second image captured a predetermined period of time after the first image and including the real object, wherein the corrected graphic compensates for latency and/or delay times associated with the display of the original graphic; and projecting the corrected graphic on to the display field such that the graphic is perceived by the viewer from the predetermined viewing position with direct reference to the real object also perceivable by the viewer through the display field from the predetermined viewing position, wherein a detail of the second image is determined, which detail comprises the real object, based on a determined intrinsic movement of the vehicle, and the corrected graphic is determined based on the detail of the second image.

2. The method according to claim 1, wherein the second image is the most recent captured image of the sequence of images.

3. The method according to claim 2, wherein the second image comprises a stereo image and the detail of the second image is determined based on a position of a vehicle driver and a capture position of the second image.

4. The method according to claim 1, wherein a current first position of the object is determined based on the second image and/or the detail of the second image, and the corrected display image is determined based on the first position and a second position which the at least one object occupies in the vehicle environment model.

5. The method according to claim 1, wherein a characteristic image feature of the object is determined based on the second image and/or the detail of the second image, and the corrected display image is determined based on the image feature.

6. The method according to claim 5, wherein the characteristic image feature comprises a respective border of the at least one object.

7. The method according to claim 5, wherein a color and/or brightness of the graphic is adapted based on a characteristic image texture of the object in the first image, the second image, and/or the detail of the second image.

8. An image determining system for a head-up display, comprising:
an evaluation unit operatively configured to detect and to determine a position of a viewer perceivable real object of a vehicle environment, based on image data of a first image of an image sequence captured via an image sensor;
a prediction unit operatively configured to determine an absolute movement and/or a relative movement of the real object with reference to the vehicle based on at least one sensor signal;
a scene unit operatively configured to determine a vehicle environment model based on the first image and the determined absolute movement and/or relative movement of the real object; and
a controller operatively configured to determine a corrected graphic based on the environment model and a second image of the image sequence, the second image captured a predetermined period of time after the first image and including the detected real object, wherein the corrected graphic compensates for latency and/or delay times associated with the display of the original graphic,
wherein a detail of the second image is determined, which detail comprises the real object, based on a determined intrinsic movement of the vehicle, and the corrected graphic is determined based on the detail of the second image;
wherein the real object is perceivable by the viewer through a display field of the heads-up-display from the predetermined viewing position.

9. The method according to claim 1, wherein the detail of the second image is a viewing-angle-corrected detail.

10. The image determining system according to claim 8, wherein the detail of the second image is a viewing-angle-corrected detail.

* * * * *